Patented Jan. 12, 1954

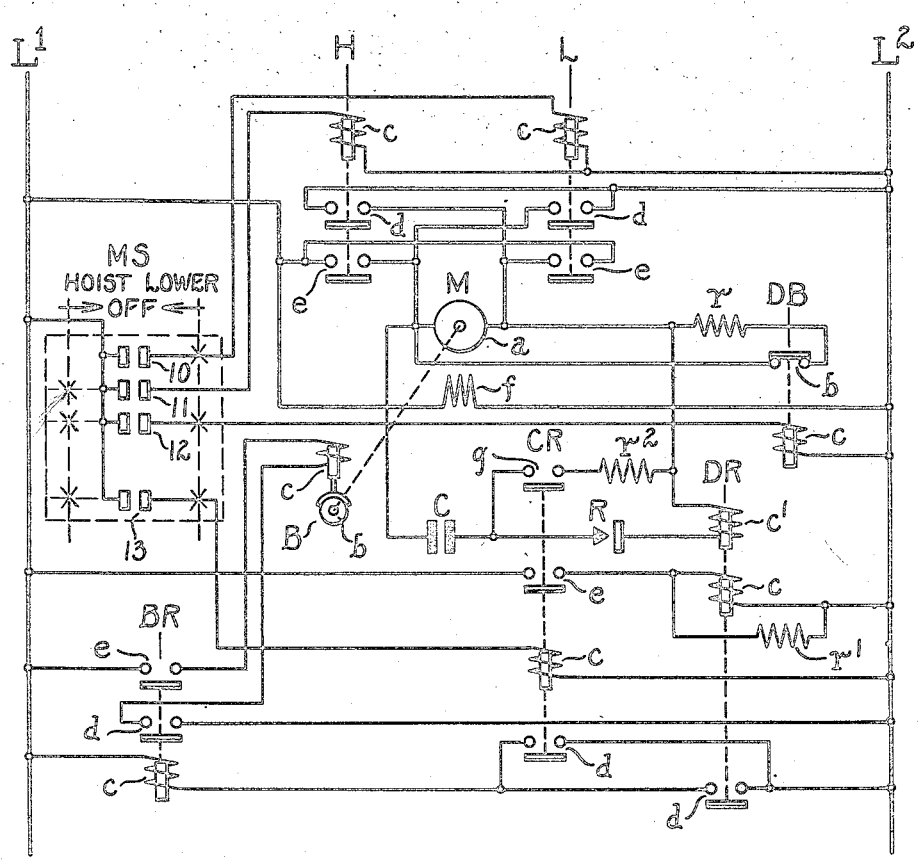

2,666,176

UNITED STATES PATENT OFFICE 2,666,176

ELECTRIC MOTOR BRAKING SYSTEM

Douglas W. Fath, Milwaukee, Wis., assignor to Cutler-Hammer, Inc., Milwaukee, Wis., a corporation of Delaware Continuation of application Serial No. 553,151, September 8, 1944. This application June 29, 1953, Serial No. 364,617

12 Claims. (Cl. 318—367)

This invention relates to improvements in motor control systems, and particularly to an improved circuit especially useful for control of an electromechanical brake for the controlled motor.

This application is a continuation of my application Serial No. 553,151, filed September 8, 1944.

Where a motor is used for hoisting and lowering it is common practice to provide for both dynamic braking and mechanical braking of the motor, and to delay setting of the mechanical brake pending slowdown of the motor by dynamic braking. However, there has been no entirely satisfactory solution of the problem of delaying setting of the mechanical brake as desired and yet insuring setting thereof under all desired conditions, as for example where the motor fails to slow down as planned, and the present invention has among its objects improvement of such brake control.

Another object is to provide a relay circuit suitable to control an electromechanical brake or other device, which circuit will function according to the rate of change in the motor speed to hold off the mechanical brake if the motor decelerates as planned and to release the brake promptly should the motor fail to decelerate or to decelerate too slowly.

Another object is to provide a circuit of such character which will be simple, economical and reliable.

Another object is to provide such a circuit which will require a minimum of change in systems of present design.

Various other objects and advantages of the invention will hereinafter appear.

One embodiment of the invention is illustrated in the accompanying drawing which will now be described, it being understood that the embodiment illustrated is susceptible of various modifications without departing from the scope of the appended claims.

Referring to the drawing, the same shows a reversible direct current motor M having an armature $a$ and a shunt field winding $f$ to be supplied with power from lines $L^1$ and $L^2$. This motor is shown as provided with an electromechanical brake B of the spring applied type comprising a drum $b$ connected to the shaft of the motor armature $a$ and a releasing winding $c$. Also the motor M is shown as provided with a dynamic braking circuit hereinafter described. It may be assumed that the motor is used for hoisting and lowering.

It being well known how such motors may be controlled for hoisting and lowering and for dynamic braking of the motor in lowering, it has been deemed sufficient here to illustrate only reversing connections for the motor armature under the control of an electroresponsive hoist switch H and an electroresponsive lowering switch L, and a dynamic braking circuit including a resistor $r$, which dynamic braking circuit is under the control of an electroresponsive switch DB. Each of the switches H and L has an operating winding $c$ and normally disengaged contacts $d$ and $e$. As will be apparent, the contacts of switch H establish line connections for the motor armature, causing the current from line $L^1$ to traverse the motor armature from left to right, while the contacts of switch L establish connections causing the current from line $L^1$ to traverse the motor armature from right to left, the shunt field winding of the motor being permanently connected across lines $L^1$ and $L^2$ for constant polarity. The dynamic braking switch DB has a winding $c$ and normally engaged contacts $b$, which as will be apparent complete a closed loop across the motor armature $a$ inclusive of resistance $r$. In practice it is customary to control such electroresponsive switches by a master switch of the drum type, and such a switch MS is illustrated schematically. However, the contact showing of the switch MS is limited to the contacts required for control of switches H, L and DB, and another switch hereinafter described.

The master switch MS is shown as comprising contacts 10 to control the winding of switch L, contacts 11 to control the winding of switch H, contacts 12 to control the winding of switch DB, and contacts 13 to control the winding of the additional switch aforementioned. The master switch is shown as having an off position wherein the contacts 10 to 13 are disengaged and as being movable in opposite directions from off position for engagement of contacts 11, 12, 13 or alternatively of contacts 10, 12, 13 as indicated by the X symbols, for hoisting and lowering selectively. As will be understood, the drum may be constructed to effect engagement of these contacts in the desired hoisting or lowering positions of the drum. It may be assumed that the contacts 11 and 12 are engaged in all hoisting positions and the contacts 10 and 12 engaged in all lowering positions, thus providing for energization of the switch DB to open the dynamic braking connections except in off position, return to which deenergizes the switch DB to permit the contacts $b$ thereof to reengage for completion of the dynamic braking connections.

As aforeindicated it is desired to release the electromechanical brake B by energization of its winding $c$ throughout power operation of the motor and during dynamic braking of the motor until the motor comes substantially to rest, assuming that the motor slows down under dynamic braking to the desired degree and at the desired rate and the means to effect such control of the brake includes electroresponsive relays BR, CR and DR. The relay BR has a winding $c$ and normally disengaged contacts $d$ and $e$, which contacts, as will be apparent, provide for connection of the brake winding $c$ directly across lines $L^1$ and $L^2$ when relay BR is energized. Relay CR provides for energization of the master switch MS. Relay CR has an operating winding $c$ and normally disengaged contacts $d$ which when engaged connect the winding $c$ of relay BR directly across lines $L^1$ and $L^2$, as will be apparent. The winding $c$ of relay CR is the aforementioned winding under the control of contacts 13 of the master switch MS, and it may be assumed that the contacts 13 are engaged in all hoisting and lowering positions of the master switch. Thus as contacts 13 when engaged connect the winding of relay CR directly across lines $L^1$ and $L^2$ said relay will respond and effect response of relay BR to release the brake B whenever the master switch is thrown to a hoist position or a lowering position.

The relay DR has windings $c$ and $c^1$ and normally disengaged contacts $d$ paralleling the contacts $d$ of relay CR, and relay DR is energized by response of relay CR, thus to establish a second or maintaining circuit for the winding of relay BR. More particularly, relay CR has normally disengaged contacts $e$ which are engaged upon response of said relay to connect across lines $L^1$ and $L^2$ the winding $c$ of relay DR. The winding $c$ of relay DR when thus energized is alone sufficient to close said relay and it holds said relay closed during continued closure of relay CR. The winding $c$ of relay DR has a shunt including a resistor $r^1$, to afford said winding a time element incident to release of contacts $d$ for a purpose hereinafter set forth.

The winding $c^1$ of relay DR is connected in a loop across the terminals of the armature of motor M and has in series therewith a condenser C and a rectifier R. The condenser C has a charging connection shunting the winding $c^1$ and rectifier R, the shunt including a resistor $r^2$ and normally open contacts $g$ of relay CR. These elements and connections constitute the circuit affording control of the relay DR to control as desired release and setting of the brake B.

Assuming the control illustrated to be set for lowering, and then assuming return of the master switch to off position, the switch DB will be deenergized to establish dynamic braking connections and the relay CR will be deenergized to interrupt the circuit of winding $c$ of relay DR. However, the time element incident to deenergization of the winding $c$ of relay DR affords time for closure of the dynamic braking connections. Then unless the motor begins to decelerate the relay DR will release to deenergize the relay BR for setting of the electromechanical brake. If, on the other hand, the motor decelerates, the condenser C which meanwhile has been charged, discharges through the rectifier to the winding $c^1$ of relay DR, which tends to delay further the release of relay DR. If the motor decelerates at a sufficiently fast rate then the discharge from the condenser renders winding $c^1$ effective to hold the relay DR against release. On the other hand, if the motor fails to decelerate or decelerates too slowly, the condenser discharge to the winding $c^1$ of relay DR will be insufficient to hold said relay which then will open to cause setting of the electromechanical brake. Thus as aforestated setting of the brake B is controlled by the rate of deceleration of the motor to delay setting of the brake until the motor comes substantially to rest, provided that the motor actually does decelerate and at the desired rate, but setting of the brake is not dependent upon actual deceleration of the motor. Moreover should the armature voltage drop to zero immediately, due to very fast deceleration, immediate release of the relay DR for immediate setting of the brake may be effected, assuming a suitable time constant of the discharge circuit. If the motor should speed up instead of slowing down the voltage across the motor armature will increase and the current through the winding $c^1$ of relay DR will drop to zero due to the rectifier which prevents passage of reverse current, wherefore the relay DR will open immediately for immediate setting of brake B.

While the circuit described is particularly advantageous for measuring the rate of deceleration it is obvious that it may readily be adapted to measurement of the rate of acceleration for any desired use and that it further affords means for measuring the rate of either acceleration or deceleration should the rectifier R be eliminated.

What I claim as new and desire to secure by Letters Patent is:

1. The combination with a direct current electric motor, direct current power supply and means to connect said motor to said power supply and to disconnect said motor from said supply, of a condenser, an electroresponsive control instrumentality having a control winding, a series circuit for said condenser and said control winding extending across the terminals of the armature of said motor and means to establish and interrupt charging connections between said condenser and said power supply, the last mentioned means being controllable by the first mentioned means and said last mentioned means upon terminating charging of said condenser rendering said condenser dischargeable through said series circuit for excitation of said control winding varying with the rate of change in speed of said motor.

2. The combination with a direct current motor, direct current power supply and means for connecting said motor to said power supply and disconnecting said motor from said power supply, of a condenser, means under the control of the first mentioned means for charging said condenser by connection thereof to said power and to terminate charging of said condenser, a rectifier, a control instrumentality having a control winding and a circuit across the terminals of the armature of said motor connecting in series said condenser, said rectifier and said winding, which circuit is effective when the second mentioned means terminates charging of said condenser to subject said winding to the discharge of said condenser for excitation of said winding varying with the rate of change in speed of said motor, but only unidirectional speed change.

3. The combination with a direct current electric motor and a direct current power circuit of a circuit across the motor armature including in series a condenser and a winding, and means progressively to establish connection of said motor to said power circuit and in addition a charging connection for said condenser shunting said winding, and to interrupt said connections to subject said winding to the discharge of said condenser for excitation of said winding varying with the rate of change in speed of said motor.

4. The combination with a direct current electric motor and a direct current power circuit of a circuit across the armature of said motor, a condenser, a rectifier and a winding in series relation in said circuit, and means progressively to establish connection of said motor to said power circuit and in addition a charging connection for said condenser, shunting said winding and said rectifier, and to interrupt said motor and charging connections to subject said winding to the discharge of said condenser for excitation of said winding varying with the rate of change in speed of said motor, but only unidirectional speed change.

5. The combination with an electric motor, of an electromechanical brake for said motor having a winding to be energized to release said brake and to be deenergized to effect setting of said brake, means to supply power to said motor and to energize said brake winding, said means affording disconnection of said motor and tending at the same time to deenergize said brake winding, and means to delay deenergization of said brake winding, comprising a winding to be energized for delay, a condenser, a series connection for the last two mentioned elements extending across the armature of said motor whereby with said condenser charged the excitation of said winding associaed therewith will vary with the rate of change in motor speed and means coordinated with the first mentioned means to effect charging of said condenser and to time initiation of its coaction with said winding associated therewith.

6. The combination with an electric motor, of an electromechanical brake for said motor having a winding to be energized to release said brake and to be deenergized to effect setting of said brake, means to supply power to said motor and to energize said brake winding, said means affording disconnection of said motor and tending at the same time to deenergize said brake winding, and means to delay deenergization of said brake winding, comprising a winding to be energized for delay, a condenser, a rectifier, a series connection for the last three mentioned elements extending across the motor armature whereby with said condenser charged the excitation of said winding associated therewith will vary with the rate of change in motor speed, but only unidirectional speed change, and means coordinated with the first mentioned means to effect charging of said condenser and to time initiation of its coaction with said winding associated therewith.

7. The combination with an electric motor, of an electromechanical brake tending to set and having a releasing winding, means to supply power to said motor for reverse operations selectively and to establish connections for said motor to render it self-braking, and control means for said electromechanical brake comprising means responsive to the first mentioned means to energize said brake releasing winding, and further comprising to continue energization of said winding upon self-braking of said motor, a winding, a rectifier and a condenser connected in series across the armature of said motor, said control means providing for establishment and interruption of connection for charging said condenser by the power supply of said motor and said control means upon interruption of power supply to said motor rendering through the medium of the last mentioned winding continued energization of said brake releasing winding dependent upon deceleration of said motor and upon deceleration at a given minimum rate.

8. The combination with an electric motor, of an electromechanical brake tending to set and having a releasing winding, means to supply power to said motor for reverse operations selectively and to establish connections for said motor to render it self-braking, and control means for said electromechanical brake comprising means responsive to the first mentioned means to energize said brake releasing winding, and further comprising to continue energization of said winding upon self-braking of said motor, a winding, a rectifier and a condenser connected in series across the armature of said motor, rendering through the medium of the last mentioned winding continued energization of said brake releasing winding dependent upon deceleration of said motor and upon deceleration at a given minimum rate, said brake control means upon initial energization of said brake releasing winding affording said condenser a charging circuit shunting said winding and rectifier series connected thereto, subject to interruption of said charging circuit upon establishment of said braking connections for said motor.

9. The combination with a direct current motor and a direct current power circuit, of an electromagnetically controlled mechanical brake for said motor tending to set, means to effect supply of power to said motor or alternatively to establish dynamic braking connections for said motor, control means for said electromagnetically controlled mechanical brake effecting supply of power thereto upon initiation of power supply to said motor and throughout power operation of said motor, a condenser having charging connections controlled by the last mentioned means for completion when power is supplied to the motor and for interruption when power supply to said motor is discontinued for dynamic braking and means having a control winding to which it is responsive for effecting continued power supply to said electromagnetically controlled mechanical brake after establishment of dynamic braking connections, said winding and condenser having connections which upon interruption of the condenser charging connections place said winding and condenser in series across the terminals of the armature of said motor.

10. The combination with a direct current motor and a direct current power circuit, of an electromagnetically controlled mechanical brake for said motor tending to set, means to effect supply of power to said motor or alternatively to establish dynamic braking connections for said motor, control means for said electromagnetically controlled mechanical brake effecting supply of power thereto upon initiation of power supply to said motor and throughout power operation of said motor, a condenser having charging connections controlled by the last mentioned means for completion when power is supplied to the motor and for interruption when power supply to said motor is discontinued for dynamic braking, a rectifier, and means having a control winding to which it is responsive for effecting continued power supply to said electromagnetically controlled mechanical brake after establishment of dynamic braking connections, said winding, said condenser and said rectifier having connections which upon interruption of the condenser charging connections place said winding, condenser and rectifier in series across the terminals of the armature of said motor.

11. In a motor control system, an electric motor, a source of electrical energy, braking means for said motor, selectively operable means to complete and disrupt a normal conductive operating circuit between said source and said motor, means responsive to operation of said selectively operable means to render said braking means ineffective during normal operation of said motor, and delayed action means responsive to disruption of said normal conductive operating circuit between said source and said motor to prevent said braking means from effectively braking said motor until the expiration of a predetermined interval of time.

12. In an electrical motor control system, a source of electrical energy including a pair of conductors, an electric motor having a conductive winding, a circuit making and breaking device selectively operable to establish a normal conductive driving circuit between said winding and said pair of conductors and to disestablish said normal conductive driving circuit, motor braking means, braking control means normally responsive to actuation of said circuit making and breaking device to render said braking means ineffective while said circuit making and breaking device is in position to establish said normal conductive driving circuit, and delayed action means normally responsive to actuation of said circuit making and breaking device to normal driving circuit disestablishing position and connected with said braking control means to maintain said braking means ineffective during a predetermined time interval after normal driving circuit disestablishment.

DOUGLAS W. FATH.

No references cited.